United States Patent
Banker et al.

(10) Patent No.: US 10,913,675 B1
(45) Date of Patent: Feb. 9, 2021

(54) INDUSTRIAL WASTEWATER TREATMENT

(71) Applicant: P2W Ltd., Azor (IL)

(72) Inventors: Ronny Banker, Ramat-Gan (IL); Yael Zeevy Perez, Mishmar Hashiva (IL)

(73) Assignee: P2W Ltd., Azor (IL)

( * ) Notice: Subject to any disclaimer, the term of this patent is extended or adjusted under 35 U.S.C. 154(b) by 0 days.

(21) Appl. No.: 16/881,902

(22) Filed: May 22, 2020

(51) Int. Cl.
| C02F 1/44 | (2006.01) |
| C02F 1/52 | (2006.01) |
| C02F 1/66 | (2006.01) |
| C02F 9/00 | (2006.01) |
| C02F 101/10 | (2006.01) |
| C02F 101/20 | (2006.01) |
| C02F 101/22 | (2006.01) |
| C02F 103/34 | (2006.01) |

(52) U.S. Cl.
CPC ............. *C02F 9/00* (2013.01); *C02F 1/442* (2013.01); *C02F 1/444* (2013.01); *C02F 1/52* (2013.01); *C02F 1/66* (2013.01); *C02F 2101/101* (2013.01); *C02F 2101/203* (2013.01); *C02F 2101/206* (2013.01); *C02F 2101/22* (2013.01); *C02F 2103/34* (2013.01); *C02F 2301/046* (2013.01)

(58) Field of Classification Search
CPC .. C02F 1/442; C02F 1/444; C02F 1/52; C02F 1/66; C02F 9/00; C02F 2101/101; C02F 2101/203; C02F 2101/206; C02F 2101/22; C02F 2103/34; C02F 2301/046
See application file for complete search history.

(56) References Cited

U.S. PATENT DOCUMENTS

| 2011/0155665 A1* | 6/2011 | Cohen | C02F 1/441 |
| | | | 210/638 |
| 2011/0265474 A1 | 11/2011 | Schubert | |
| 2012/0205313 A1* | 8/2012 | Sathrugnan | C02F 9/00 |
| | | | 210/652 |
| 2015/0344341 A1* | 12/2015 | Wallace | C02F 9/00 |
| | | | 210/638 |

OTHER PUBLICATIONS

Office Action dated Dec. 4, 2020 for corresponding U.S. Appl. No. 17/022,745.

* cited by examiner

*Primary Examiner* — Lucas A Stelling
(74) *Attorney, Agent, or Firm* — Pearl Cohen Zedek Latzer Baratz LLP

(57) ABSTRACT

Methods and systems are provided for industrial wastewater treatment that yields zero liquid discharge (ZLD). These include pre-treating provided industrial wastewater to remove heavy metals, ultra-filtering the pre-treated wastewater to remove suspended and colloidal solids, nano-filtering the ultra-filtered wastewater to yield treated water (with monovalent ions) and a concentrate, treating the concentrate to remove di- and tri-valent elements and other compounds from the concentrate, and to reduce a level of sulfates to a specified level which is above a solubility level of sulfates—to yield returned water, and sludge, mixing the returned water with the provided industrial wastewater before or at the first treatment stage and/or with the pre-treated wastewater before the ultrafiltration, and removing residual water from the sludge to yield removed solids with ZLD. Advantageously, disclosed processes and systems are efficient, cheaper and more sustainable than prior art systems.

10 Claims, 11 Drawing Sheets

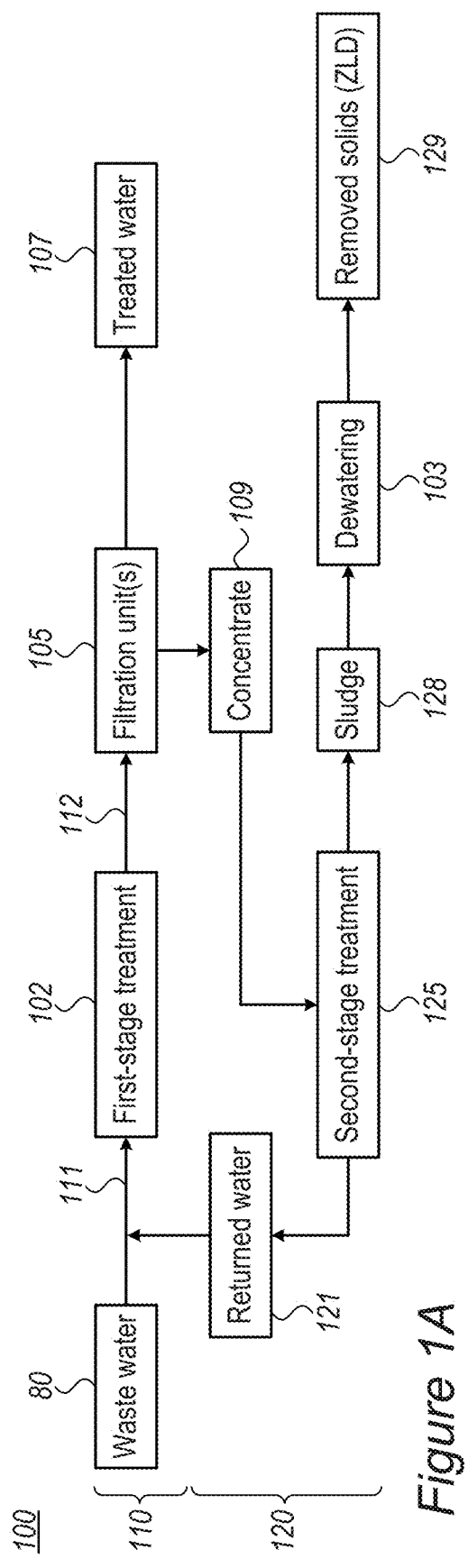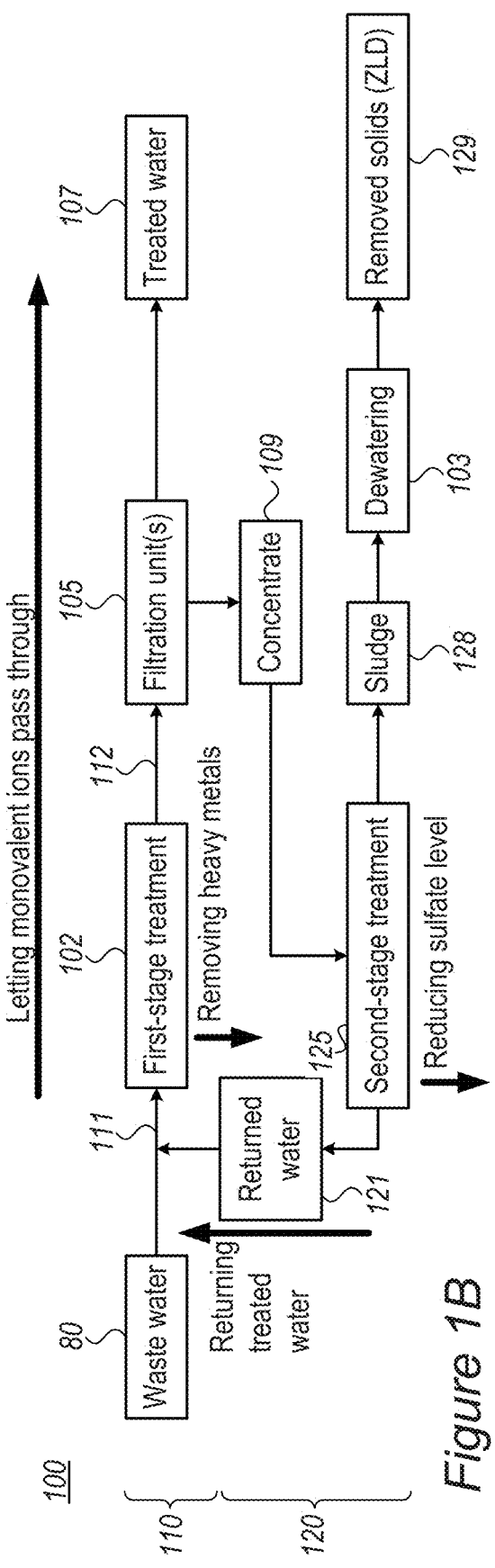
Figure 1A
Figure 1B

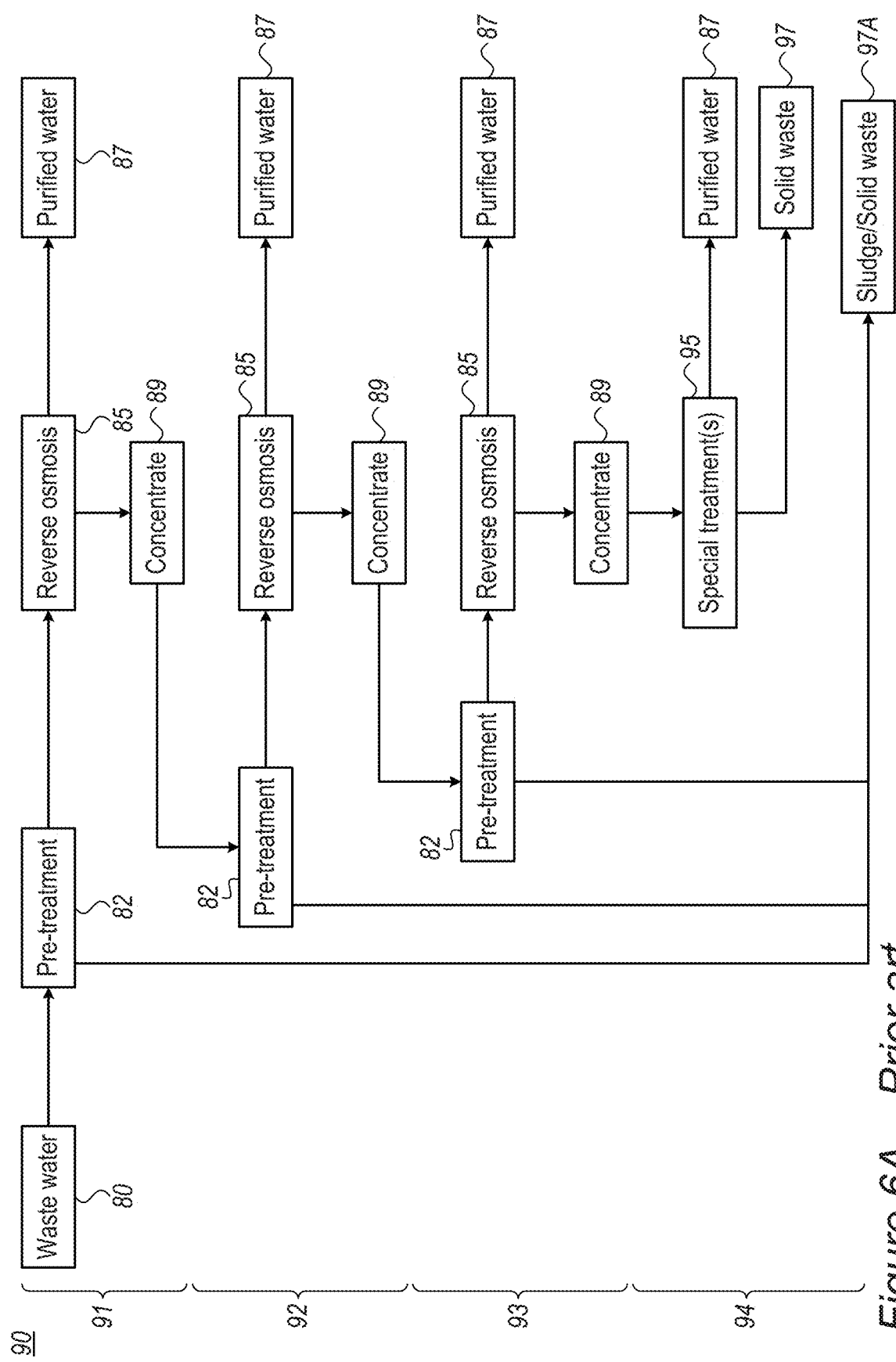
Figure 6A – Prior art

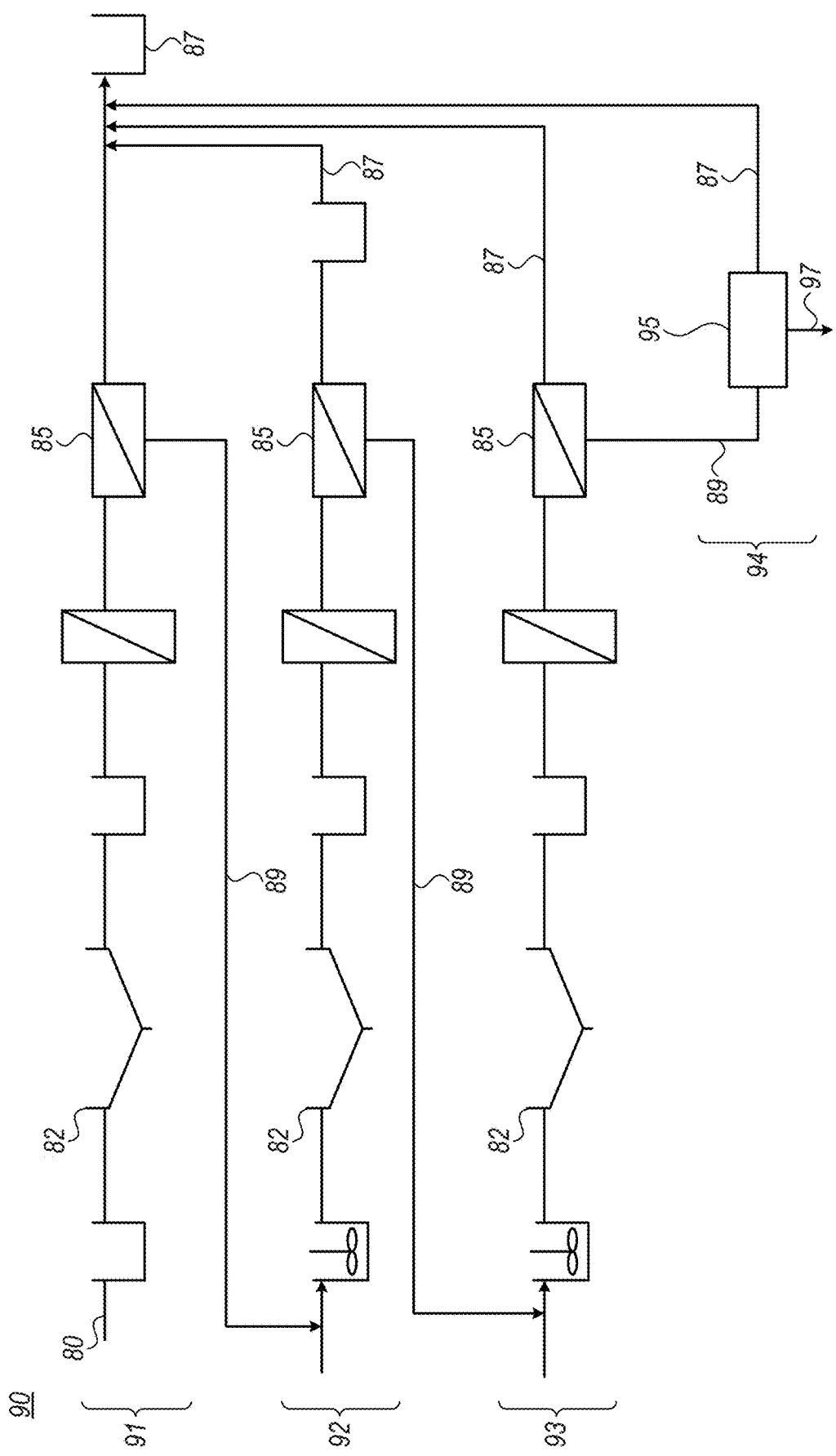
Figure 6B – Prior art

US 10,913,675 B1

INDUSTRIAL WASTEWATER TREATMENT

BACKGROUND OF THE INVENTION

1. Technical Field

The present invention relates to the field of industrial wastewater treatment, and more particularly, to using nano-filtration and water recycling to achieve affordable and sustainable industrial wastewater treatment.

2. Discussion of Related Art

Prior art industrial wastewater treatment systems typically apply reverse osmosis and special treatments to reach zero liquid discharge (ZLD, without any brine or concentrate being removed from the plant), see, e.g., FIGS. 6A and 6B below, however, such systems are often very expensive in construction and operation and are moreover often difficult to maintain.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a method of wastewater treatment that yields zero liquid discharge (ZLD), the method comprising: pre-treating provided industrial wastewater to remove heavy metals and suspended and/or colloidal solids, providing pre-treated wastewater, ultra-filtering the pre-treated wastewater to remove suspended and colloidal solids, nano-filtering the ultra-filtered wastewater to yield treated water and a concentrate, wherein the treated water comprises monovalent ions, treating the concentrate to remove di- and tri-valent elements and other compounds from the concentrate, and to reduce a level of sulfates to a specified level which is above a solubility level of sulfates—to yield returned water, and sludge, mixing the returned water with the provided industrial wastewater before or at the first treatment stage and/or with the pre-treated wastewater before the ultrafiltration, and removing residual water from the sludge to yield removed solids with ZLD.

One aspect of the present invention provides a system for wastewater treatment that yields zero liquid discharge (ZLD), the system comprising: a first treatment stage comprising: a first-stage treatment unit configured to remove heavy metals and suspended and/or colloidal solids from provided industrial wastewater, and a filtration unit comprising: at least one ultra-filtration unit configured to remove suspended and colloidal solids from the pre-treated wastewater, and at least one nano-filtration unit configured to nano-filter the ultra-filtered wastewater to yield treated water and a concentrate, wherein the treated water comprises monovalent ions; a second treatment stage comprising: a second-stage treatment unit configured to remove di- and tri-valent elements and other compounds from the concentrate, and to reduce a level of sulfates to a specified level which is above a solubility level of sulfates—to yield returned water, and sludge, and a final unit configured to remove residual water from the sludge to yield removed solids with ZLD; and pipework configured to mix the returned water with the provided industrial wastewater at the first treatment stage, before, at and/or after the first-stage treatment unit.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A and 1B are high-level block diagrams of systems for wastewater treatment that yields zero liquid discharge (ZLD), schematically illustrating the main units, their functions and the flows in systems 100, according to some embodiments of the invention.

FIGS. 6A and 6B are high-level schematic illustration of prior art ZLD water treatment systems.

DETAILED DESCRIPTION OF THE INVENTION

Figure 2:
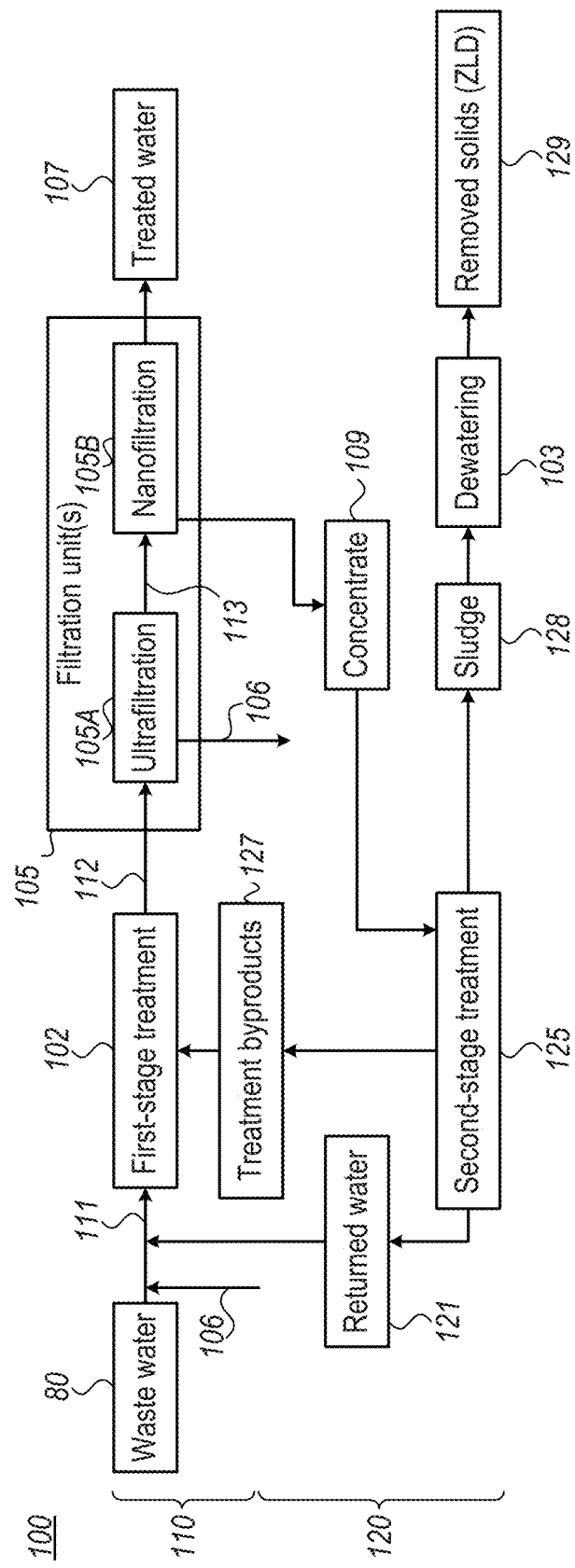
FIG. 2 is a high-level schematic block diagram of systems for ZLD wastewater treatment that include using byproducts from the second stage in the first stage, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for handling industrial wastewater and thereby provide improvements to the technological field of industrial wastewater treatment. Methods and systems are provided for industrial wastewater treatment that yields zero liquid discharge (ZLD). These include pre-treating provided industrial wastewater to remove heavy metals and suspended and/or colloidal solids, ultra-filtering the pre-treated wastewater to remove suspended and colloidal solids, nano-filtering the ultra-filtered wastewater to yield treated water (that include monovalent ions) and a concentrate, treating the concentrate to remove di- and tri-valent elements and other compounds from the concentrate, and to reduce a level of sulfates to a specified level which is above a solubility level of sulfates—to yield returned water, and sludge, mixing the returned water with the provided industrial wastewater before or at the first treatment stage and/or with the pre-treated wastewater before the ultrafiltration, and removing residual water from the sludge to yield removed solids with ZLD (without any brine or concentrate being removed from the plant). Advantageously, disclosed processes and systems are efficient, cheaper and more sustainable than prior art systems. Specifically, disclosed processes and systems are advantageous with respect to prior art ZLD systems based on multi-stage reverse osmosis and special treatment of remaining residues with respect to both constructions costs (CAPEX—capital expenditure) and maintenance costs (OPEX—operation expenditure) and more over make ZLD industrial wastewater treatment affordable and sustainable.

Various embodiments are configured to treat a wide range of types of industrial wastewater, which may have various concentrations of a large number of contaminants. The systems and methods disclosed below may be adjusted, as explain below, to handle industrial wastewater with these ranges of contaminations, providing ZLD. For example, metals and/or heavy metals such as Ag (typical value 0.1 mg/l, range up to 100 mg/l), Al (typical value 0.5 mg/l, range up to 1000 mg/l), As (typical value 0.8 mg/l, range up to 100 mg/l), Cd, Co, Cr, Mo, Ni (typical values 0.5 mg/l, ranges up to 100 mg/l), Cu, Mn (typical values 0.5 mg/l, ranges up to 500 mg/l), Fe (typical value 1 mg/l, range up to 500 mg/l), Pb, Sb, Se, Sn, Ti, V (typical values 0.5 mg/l, ranges up to 5 mg/l) and Zn, V (typical value 0.5 mg/l, range up to 1000 mg/l)—typical to industrial wastewater from metal and mining industries—may be removed from the wastewater as disclosed below. Related alkaline earth metals Mg (typical value 50 mg/l, range up to 1000 mg/l) and Ca (typical value 120 mg/l, range up to 2000 mg/l), as well as Be and Ba (typical values 0.5 mg/l, ranges up to 5 mg/l) may also be removed. Other elements and compounds in metal-related and other industrial process include silica ($SiO_2$ typical value 0.5 mg/l, range up to 10 mg/l), sulfates ($SO_4$ typical value 500 mg/l, typical range between 500-10,000 mg/l), phosphates ($PO_4$ typical value 1 mg/l, typical range up to 5 mg/l), cyanides (CN typical range up to 10 mg/l), as well as carbonates ($CO_3$ typical value 10 mg/l, typical range up to 100 mg/l) and bicarbonates ($HCO_3$ typical value 20 mg/l, typical range up to 100 mg/l) and nitrates ($NO_3$ typical value 20 mg/l, typical range up to 100 mg/l)—all of which may be removed in the ZLD processes and systems disclosed below. Other relevant elements and compounds include F (typical value 0.5 mg/l, typical range up to 5 mg/l, also typical in metal-related industries), Cl (typical value 250 mg/l, typical range between 20-250 mg/l), nitrogen dioxide ($NO_2$ typical value 5 mg/l, typical range up to 50 mg/l), P (typical value 0.5 mg/l, range up to 5 mg/l), monovalent Na (typical value 150 mg/l, range between 20-250 mg/l) and K (typical value 15 mg/l, range up to 100 mg/l), and B (typical value 0.5 mg/l, typical range up to 5 mg/l). Other characteristics of industrial wastewater, which can be treated in disclosed systems and methods below, include conductivity (typical value 2500 µs/cm, typical range between 1,000-20,000 µs/cm), pH (typical value 7.5, typical range between 1.5-12), total dissolved solids (TDS, typical values 1,000-1,500 mg/l, typical range between 650-15,000 mg/l), total suspended solids (TSS, typical value 25 mg/l, typical range between 1-1,000 mg/l), turbidity (NTU, Nephelometric Turbidity Units, typical value 50 NTU, typical range between 1-300 NTU) as well as color (platinum-cobalt scale, typical value 30 typical range between 1-300). Disclosed systems and methods may be configured and/or adjusted to manage these characteristic according to given specifications, as disclosed below. Clearly, as these ranges and compositions are very versatile, adjustments of the disclosed systems and methods are shown below only for a few, non-limiting examples, which provide the principles for adjusting the disclosed systems and methods to treat any composition of industrial wastewater that is required to be handled.

FIGS. 1A and 1B are high-level block diagrams of systems 100 for wastewater treatment that yields zero liquid discharge (ZLD), schematically illustrating the main units, their functions and the flows in systems 100, according to some embodiments of the invention.

Systems 100 comprise a first treatment stage 110 and a second treatment stage 120. First treatment stage 110 comprises a first-stage treatment unit 102 configured to remove metals and/or heavy metals and optionally suspended and/or colloidal solids (reduce TDS and/or TSS, and possibly other contaminants, according to the wastewater quality) from provided industrial wastewater 80, and filtration unit(s) 105 configured to filter the pre-treated wastewater to yield treated water that may include monovalent ions 107 (and possibly some bivalent and/or trivalent ions at low concentrations), and a concentrate 109. Second treatment stage 120 comprises a second-stage treatment unit 125 configured to treat concentrate 109 to remove mainly divalent ions and other compounds and elements that were not removed by first-stage treatment unit 102 (as specified) and particularly to reduce a level of sulfates to a specified level which is above a solubility level of sulfates (e.g., 1500-2000 ppm)—to yield returned water 121, and sludge 128. Second treatment stage 120 further comprises a dewatering unit 103 (e.g., comprising a filter press or a dewatering unit) configured to remove residual water from sludge 128 to yield removed solids 129 with ZLD. The residual water may be mixed back into treated water at various stages (see below). Systems 100 further comprise pipework configured to mix returned water 121 with provided industrial wastewater 80 at first treatment stage 110, before, at or after first-stage treatment unit 102. It is noted that while sulfates are used herein as an illustrative example, other compounds, e.g., other divalent and/or trivalent ions (e.g., $Mg^{++}$) may be removed according to similar principles.

Second-stage treatment unit 125 may be configured to use calcium, calcium compounds and/or sodium hydroxide to reduce the level of sulfates to the specified level of sulfates, which may be between 2,000-5,000 ppm, or between 2,500-4,000 ppm, or between similar ranges, depending on regulated required sulfate level reduction and system configuration. In various embodiments, second-stage treatment unit 125 may be configured to reduce the level of sulfates to any of about a level of sulfates in provided industrial wastewater 80, to a somewhat higher level (e.g., 110%, 120%, possibly up to 150%, or any intermediate value, as long as the concentrations stabilize over multiple reiterations) or to a lower level (e.g., about 80%, 60%, 40%, 20% or any intermediate fraction thereof), depending on the initial concentration of the respective contaminant and the throughputs of the respective portions of water (e.g., resulting from performance parameters of filtration units 105). In certain embodiments, second-stage treatment unit 125 may be configured to reduce the level of sulfates to about a half of a level of sulfates in provided industrial wastewater 80. The level of reduction of sulfates in second-stage treatment unit 125 may be derived from the throughput of concentrate 109 with respect to the throughput of wastewater 80 (see schematic example in Table 1 below). In various embodiments, second-stage treatment unit 125 may be configured to use e.g., lime, Ca, CaO, $Ca(OH)_2$, $CaCO_3$, $CaMg(CO_3)_2$, possibly NaOH, or comparable compounds to remove sulfates. Corresponding chemicals may be used to remove other divalent and/or trivalent ions in second-stage treatment unit 125. It is noted that the concentration of the removed compounds in concentrate 109 (e.g., two to three folds with respect to wastewater 80) by filtration unit(s) 105, particularly by nanofiltration unit(s) 105B (see below), enables efficient removal of contaminants without having to cross the solubility threshold.

For example, in certain embodiments, first-stage treatment unit 102 may configured to remove any of Cd, Al, Fe, Mn, Zn, As, Pb, Cu etc., possibly adjust pH, remove some $SO_4$ and possibly any of Ca, Mg, $CO_3$, $SiO_2$ and so forth, and corresponding compounds thereof, depending on wastewater composition, contaminants' concentrations and the system's specific design. In certain embodiments, second-stage treatment unit 125 may be configured to remove any of, e.g., $SO_4$, $SiO_2$, Ca, Mg, $CO_3$, and corresponding compounds thereof, as well as suspended and colloidal solids, and further adjust water parameters, depending on wastewater composition, contaminants' concentrations and the system's specific design.

While pipework is not illustrated explicitly, corresponding pipes, conduits, pumps, spigots, flow controllers, containers etc. are used to regulate the disclosed flows. Specifically flow 111 relates to the flow of feed wastewater 80 plus returned water 121 and flow 112 relates to the flow of first-stage pre-treated water that is provided to filtration unit(s) 105. Corresponding pipework and flow elements may be applied to regulate the disclosed flows.

Referring to FIG. 1B, systems 100 may be configured to remove at least heavy metals (possibly also any of $SO_4$, $CO_3$, $HCO_3$, Mg, Ca and other contaminants) by first-stage treatment unit(s) 102, remove concentrate 109 from pre-treated wastewater 112 by filtration unit(s) 105 which are configured to let monovalent ions (e.g., $Na^+$, $Cl^-$), and possibly some bivalent and/or trivalent ions at low concentrations, pass therethrough with treated water 107, reduce sulfate levels (possibly also the levels of any of Mg, Ca, and any other di-/tri-valent ions and other contaminants) and remove other contaminants by second-stage treatment unit 125, and return remaining dissolved sulfates in returned water to first stage 110, e.g., to be mixed with wastewater 80 to form flow 111, or possibly at least partly to be mixed with pre-treated water 112. The sulfate levels (and levels of equivalent elements and compounds, e.g., divalent ions) are reduce to a level above their solubility threshold that is low enough so that sulfates do not accumulate in the first stage and do not damage the membranes of filtration unit(s) 105, as disclosed below. In case divalent ions are left in treated water 107, their amount is a few percent at most of their amount in wastewater 80, e.g., 1-3% of the sulfates in wastewater 80 may remain in treated water 107, as long as their level is below the respective regulated requirements. Accordingly, at least 97-99% of the amount of sulfates in wastewater 80 may be removed in solids 129. Correspondingly, concerning monovalent ions, system 100 may be configured to pass 5-30% of their amount in wastewater 80 into treated water 107, avoiding accumulation of monovalent ions throughout the cycling and operation of system 100.

Table 1 provides a schematic example that illustrates treating a few contaminants by system 100, referring to stages of the processes illustrated in FIGS. 1A and 1B. The example is non-limiting as it refers to only a few contaminants (for simplicity), is schematic with respect to the flows and provides ranges for the contaminants after each stage. It is further noted that concentrations are typically building up and then stabilizing through the system, as the mixing of the returned water readjusts the flows and concentrations. Table 1 provides ranges for an estimated stable state, following the initialization phase of system 100. It is assumed that the feed flow to the plant is 100 $m^3/h$, that the total plant recovery is between 95-97%, that nanofiltration (NF) recovery is between 55-65%, that Na and Cl ions permeate through to the treated water and their concentration is similar to their concentration in the feed water, and the concentration ranges are provided from a simulation after running it for over 10,000 cycles. The full ZLD process removes heavy metals (Al, Fe, Mn, Cu, Zn, As, Cd, Mn, Cr, etc.) as found in industrial wastewater 80, as well as sulfates, magnesium, cyanides, calcium, etc.

TABLE 1

A schematic high-level illustrative example for treating industrial wastewater by the disclosed systems and processes.

| | | Wastewater (80) | Removal of heavy metals in the first stage (112) | Concentrate (109) | Returned water (121) | Following first-stage treatment and mixing (112) | Treated water (107) |
|---|---|---|---|---|---|---|---|
| | | | Stage of process: | | | | |
| Throughput (m³/h) | | 100 | 100* | 54-82 | 54-82 | 100* | 95-97 |
| Ion/Element (mg/l) | $Ca^{++}$ | 550 | See following mixing* | 1,200-1,500 | 500-700 | 550-600 | 10-30 |
| | $Na^+$ | 85 | | 1,000-1,500 | 1,000-1,500 | 500-550 | 85 |
| | $Mg^{++}$ | 500 | | 1,000-3,500 | 300-500 | 400-500 | 10-20 |
| | $SO_4^{--}$ | 3,500 | | 8,000-12,000 | 3,500-4,500 | 3,500-4,000 | 100-200 |
| | $Cl^-$ | 31 | | 400-500 | 400-500 | 150-200 | 31 |
| | Al | 0.5-5 | <0.05 | <0.05 | <0.05 | <0.05 | <0.05 |
| | Fe | 1-10 | <0.05 | <0.05 | <0.05 | <0.05 | <0.05 |
| | Mn | 0.5-5 | <0.05 | <0.05 | <0.05 | <0.05 | <0.05 |
| | Cu | 10-100 | <0.05 | <0.05 | <0.05 | <0.05 | <0.05 |

*Concentrations following the mixing were calculated according to the relative throughputs, assuming recovery rates of 55-70% water 107 and 45-30% rejected concentrate 109.

It is noted that, following removal of heavy metals and possibly additional elements in first stage treatment 102, most mass of divalent ions and other compounds is removed in second-stage treatment unit 125 from concentrate 109. However, these are removed to a level above their solubility level (see, e.g., sulfates), using simple and fast technology, and the remaining contaminants are returned back to the received flow of industrial wastewater 80 (or optionally after first-stage treatment 102—to flow 112—as returned water 121 lack heavy metals). As the concentration of the remaining contaminants is about their concentration in provided industrial wastewater 80, they do not accumulate, and their concentration does not rise about the level that is permitted by filtration unit(s) 105. Filtrations unit(s) 105 remove these contaminants into concentrate 109, resulting in treated water with contaminants level (e.g., sulfates) below the solubility level—without having to apply the expensive prior art special treatment technologies 95 to reduce their levels (see below). It is noted that the concentrations of various elements and compounds throughout system 100 depend on the system configuration, such as throughputs and number of cycles through which the system is operated (in operation and in simulation) until steady state is reached.

In various embodiments, first-stage treatment unit 102 may be configured to provide minor pre-treatment, e.g., only adjust the pH of the water and remove heavy metals, or to provide more significant pre-treatment, e.g., also remove some of the sulfates and/or reduce any of TDS, TSS, turbidity, etc. In various embodiments, first-stage treatment unit 102 may be configured to provide a level of pre-treatment that depends on the quality of received industrial wastewater 80 with respect to specified operation requirements of filtration unit(s) 105. For example, if the level of sulfates in wastewater 80 is around 3000 ppm, no further reduction may be required at first stage 110, but if the level of sulfates in wastewater 80 is around 10,000 ppm, first-stage treatment 102 may be configured to reduce it to 3000-4000 ppm. It is noted that in any case, second-stage treatment unit 125 may be configured to remove the bulk of sulfates and/or equivalent contaminants (from concentrate 109) to reach a level of sulfates that can be returned (121) to the received water (forming flow 111) without building up the sulfate concentration at the first stage 110.

FIG. 2 is a high-level schematic block diagram of systems 100 for ZLD wastewater treatment that include using byproducts 127 from second stage 120 in first stage 110, according to some embodiments of the invention.

In certain embodiments, filtration units 105 may comprise ultrafiltration unit(s) 105A followed by nanofiltration unit(s) 105B, which are configured to remove concentrate 109 from the water while letting monovalent ions (and possibly some bivalent and/or trivalent ions at low concentrations) pass through with treated water 107. For example, filtration units 105 may comprise one or more ultrafiltration (UF) unit(s) 105A to remove or reduce the level of solids and colloids in water 112 and one or more nanofiltration (NF) unit(s) 105B to selectively remove or reduce the level of bivalent ions and other compounds in water 113. Backwash 106 from UF unit(s) 105A may be re-introduced into first stage treatment unit(s) 102 while concentrate 109 from NF unit(s) 105B may be treated in second stage treatment unit(s) 125.

It is noted that UF membranes typically remove colloidal and suspended solids in the water passing through it, while NF membranes typically reject most, or almost all of the divalent ions in the water passing through it, while passing through some of the monovalent ions (other than RO membranes that reject most or all of the monovalent ions). UF membranes typically have pore sizes greater than 10 nm (e.g., 10-50 nm), may be made from polymeric (e.g., PVDF—polyvinylidene difluoride) hollow fibers for high mechanical strength and chemical resistance, and remove a wide range of particulates. NF is intermediate between UF and RO, may be made from thin-film composites (e.g., polyamide), typically removing solutes down to a scale of 1 nm and rejecting organic molecules with molecular weights greater than 200-400, such as dissolved organics, endotoxins/pyrogens, insecticides/pesticides, herbicides, antibiotics, nitrates, sugars, latex emulsions, metal ions, etc., as well as soluble salts, e.g., at rates of 20-80% for monovalent anions (e.g., sodium chloride or calcium chloride) and 90-98% for divalent anions (e.g., magnesium sulfate). Thus, a nanofiltration unit has smaller pore sizes than an ultrafiltration unit, for example less than 10 nm. It is further noted that the system configuration includes the degree to which water is cycled through the respective membranes, influencing the resulting ion concentration in the treated water. The more passes a certain amount of water carries out through a set on membranes, and/or the more membranes are used for a given throughput, the lower is the resulting ion concentration in the treated water.

Accordingly, treated water 107 may include additional elements or compounds at low level, in particular sulfates below the solubility threshold (e.g., <1500-2000 ppm, typically few hundred ppm at most, typically between 250-500 ppm, depending on regulatory requirements). It is noted that prior art RO treatment results in water that is very pure, and usually requires post-process additions of minerals for various uses, making permissible the residual low levels of elements and compounds achieved by disclosed embodiments. In various embodiments, NF unit(s) 105B may let most monovalent pass through to treated water 107, while letting up to 1%, up to 3%, or possibly up to 5% or between 1-10% of one or more divalent or trivalent ions pass through.

It is noted that as concentrate 109 rejected from NF unit(s) 105B (and possibly backwash water 106 from UF unit(s) 105A) is devoid of heavy metals, at least some of the water may be returned into first treatment stage 110 after first-stage treatment 102.

In certain embodiments, sludge and/or solids 104, and/or any treatment products 127 from second treatment stage 120 may be used in pre-treatment 102 of first treatment stage 110, e.g., to enhance coagulation and/or flocculation in first stage treatment unit 102. For example, particles from particle-based second-stage treatment unit 125 may be delivered as treatment products 127 to first-stage treatment unit 102.

For example, second treatment stage 120 may comprise a fluid bed reactor, FBR 125C (see FIGS. 5A and 5B below), having solid granular material that is fluidized by a fluid passed therethrough at high velocities, and system 100 may be further configured to utilize used FBR substrate (e.g., coated particles 148 as treatment byproducts 127) in first-stage treatment unit 102, for pre-treating provided industrial wastewater 80.

Figure 3:
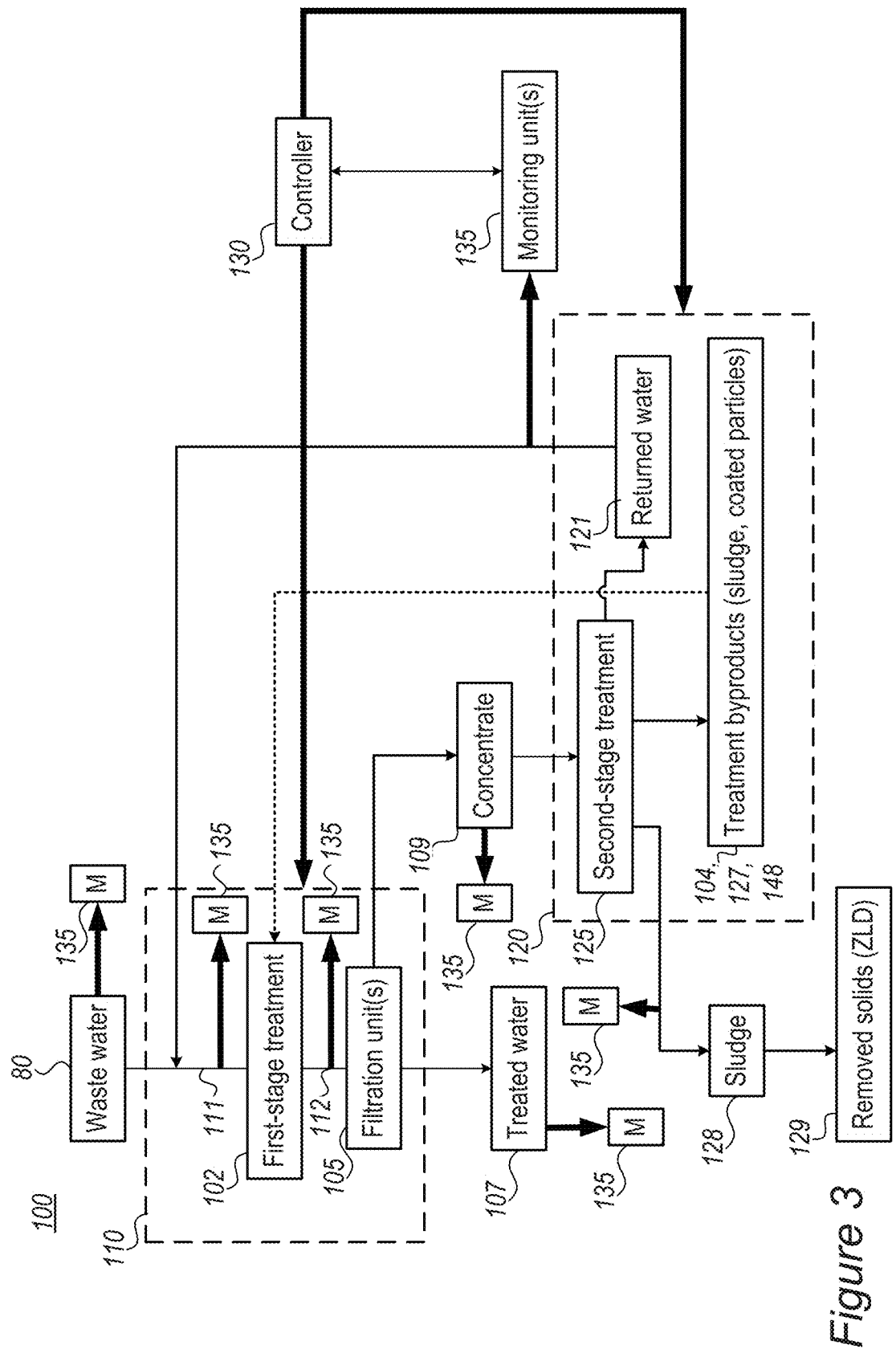
FIG. 3 is a high-level schematic block diagram of systems for ZLD wastewater treatment that illustrates monitoring and controlling contaminants and flows in systems, according to some embodiments of the invention.

FIG. 3 is a high-level schematic block diagram of systems 100 for ZLD wastewater treatment that illustrates monitoring and controlling contaminants and flows in systems 100, according to some embodiments of the invention.

Systems 100 may further comprise monitoring units(s) 135 and one or more controller 130 that are configured to monitor flows throughout systems 100 and possibly the levels of contaminants in the flows; and to control these flows and consequently the levels of contaminants in the flows, respectively—to maintain continuous operation of systems 100. Monitoring unit(s) 135 are illustrated schematically in a non-limiting manner with respect to multiple flows 80, 111, 112, 107, 109, 128 and 121 in system 100; clearly any internal flows (e.g., within filtration unit 105 such as between UF unit(s) 105A and NF unit(s) 105B, see FIG. 2) and additional flows may also be monitored with respect to their throughput and/or chemical composition. In certain embodiments, treatment by products 127 such as sludge 104 and/or coated particles 148 may also be monitored. Monitoring unit(s) 135 may be interconnected among themselves and to controller(s) 130 via various communication arrangements, e.g., wire and/or wireless communication, via a communication link or network, via cloud services etc. Monitoring unit(s) 135 may be configured to monitor the level of ions or other compounds in the various monitored flows, and the data may be used by controller 130 to adjust the process according to requirements.

Controller(s) 130 may be configured to modify flows in system 100, and possibly modify operational parameters of units in system 100 to maintain the concentrations of contaminants within specified limits that allow continuous operation of system 100 and maintain the membranes in filtration unit(s) 105 in good operational condition, reducing maintenance costs. Controller(s) 130 may be further configured to monitor a level of monovalent ions in treated water 107. In certain embodiments, controller(s) 130 may be configured to determine flows and cycling through system 100 to comply with regulatory requirements concerning levels of monovalent and/or divalent ions in treated water 107, increasing the number of cycles for a given throughput to reduce the levels of monovalent and/or divalent ions in treated water 107.

In certain embodiments, controller(s) 130 may be operated with respect to predetermined simulation data that relate contaminant levels to throughputs, making the control of contaminant levels simpler and allowing controller(s) 130 to mainly modify the flows through system 100. It is noted that the concentrations of various elements and compounds throughout system 100 depend on the system configuration, such as throughputs and number of cycles through which the system is operated (in operation and in simulation) until steady state is reached. Controller 130 may be configured to regulate these throughputs and cycling in real-time and adjust operation parameters to reach required specifications (e.g., thresholds for elements and compounds) in relation to parameters of received wastewater and system components.

Figure 4A:
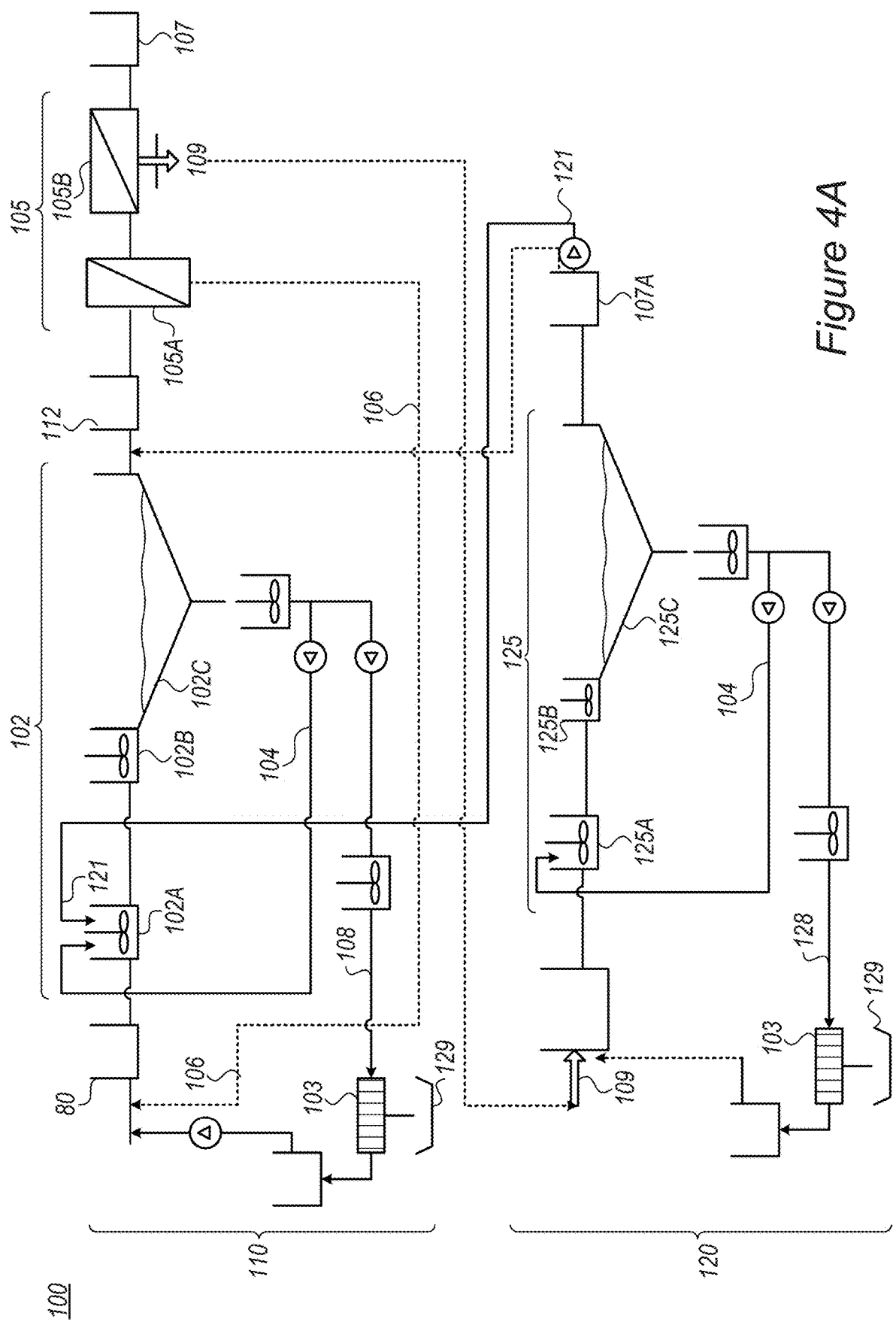
FIGS. 4A-4C provide high-level schematic examples of embodiments of systems, according to some embodiments of the invention.
Figure 4B:
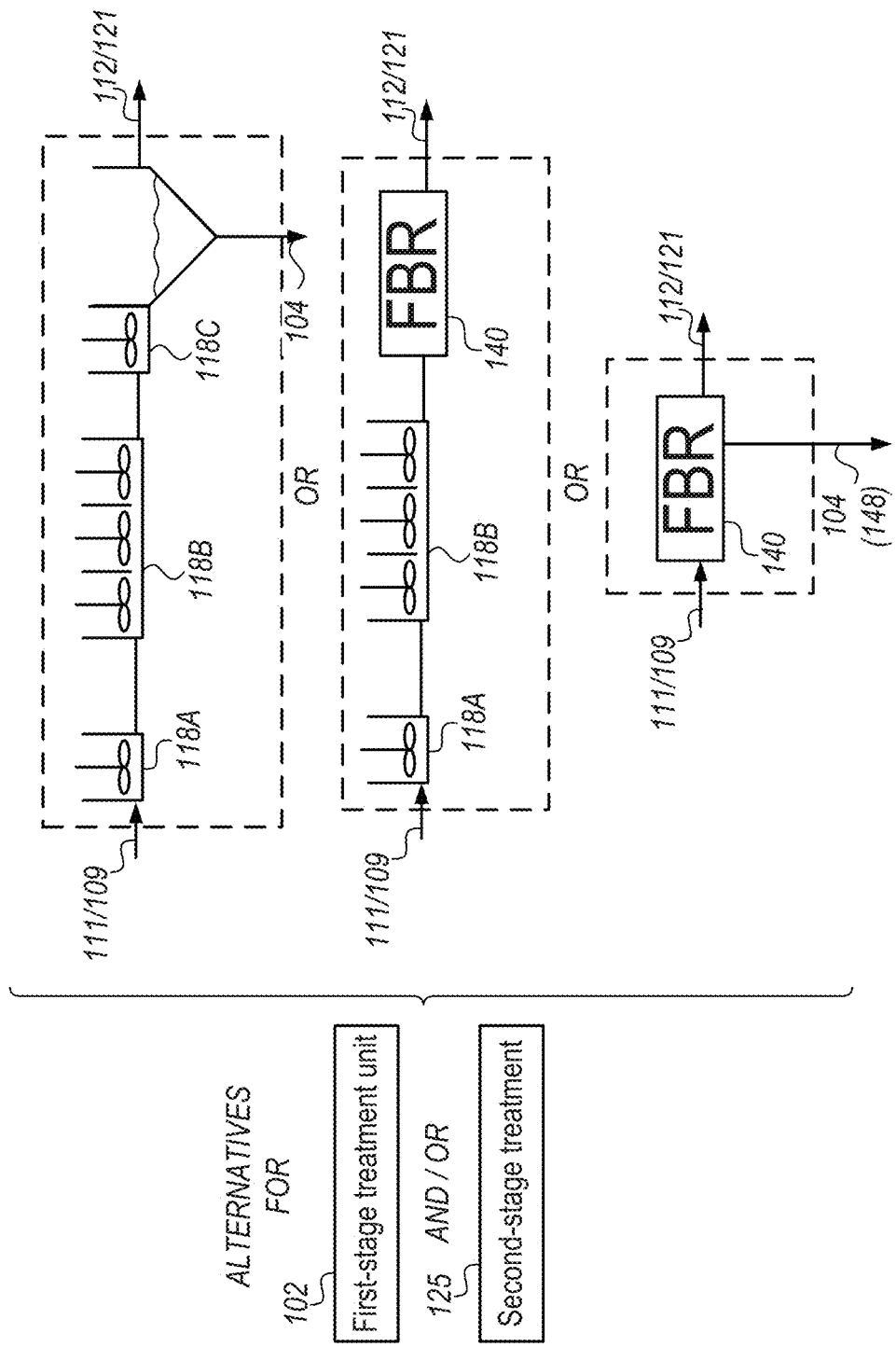
Figure 4C:
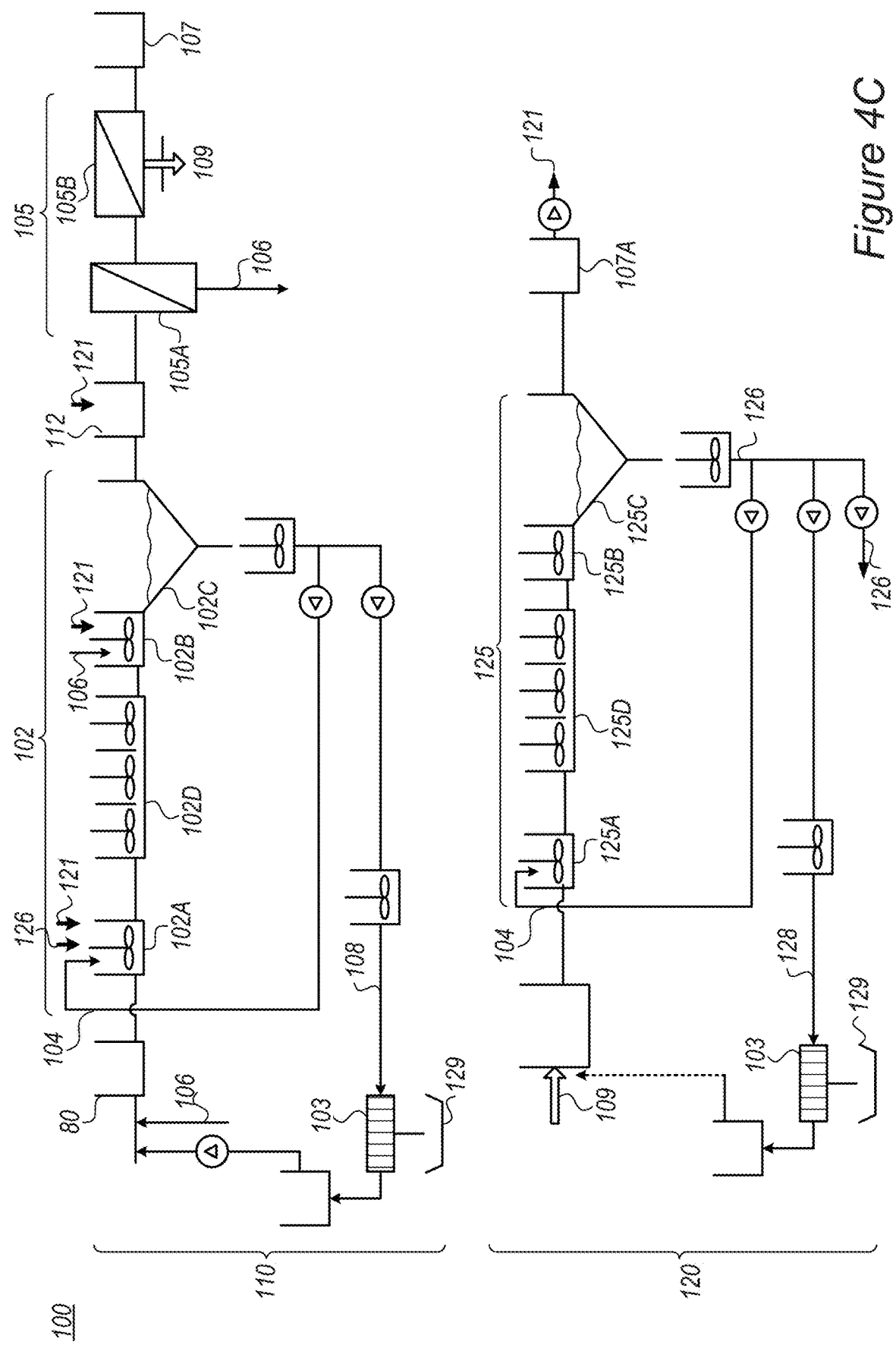

FIGS. 4A-4C provide high-level schematic examples of embodiments of systems 100, according to some embodiments of the invention. Elements from FIGS. 1A, 1B, 2, 3 and 4A-4C may be combined in any operable combination, and the illustration of certain elements in certain figures and not in others merely serves an explanatory purpose and is non-limiting.

FIG. 4A illustrates schematically certain embodiments of systems 100, comprising in first treatment stage 110, any of the following. A coagulation mixer unit 102A and/or a flocculation unit 102B may be set before a precipitation unit 102C in first-stage treatment unit 102—to improve pretreatment, e.g., by enhanced removal of heavy metals and/or silicates and/or other contaminants, and optionally to remove dissolved and/or colloidal solids. Water from precipitation unit 102C and/or water removed by a filtration and/or dewatering unit 103 from removed precipitate 108 may be re-introduced into wastewater 80.

In various embodiments, sludge and/or solid material 104 from precipitation unit 102C and/or sludge/solid material 104 from precipitation unit 125C may be recycled and used, e.g., to enhance flocculation and precipitation (using solid material 104 to yield high density sludge HDS). Sludge/solid material 104 from any one of first and second treatment stages 110, 120, respectively, may be used in the same or in the other one of first and second treatment stages 110, 120, respectively, depending on the sludge composition and the treatment requirements.

At least one ultra-filtration (UF) unit 105A may be used, e.g., to remove dissolved and/or colloidal solids prior to at least one nano-filtration (NF) unit 105B in filtration unit(s) 105. UF unit(s) 105A may be configured to provide initial filtrate 106 that may be delivered back and added to wastewater 80 and/or to locations along first-stage treatment unit 102 (e.g., flocculation unit 102B).

Certain embodiments of systems 100 may comprise in second treatment stage 120, any of the following. A coagulation mixer unit 125A and/or a flocculation unit 125B may be set before a precipitation unit 125C in second-stage treatment unit 125—to improve pretreatment, e.g., to remove sulfates (above their solubility threshold), e.g., using calcium (e.g., Ca, CaO, Ca(OH)$_2$, etc.) to yield gypsum, and to remove additional compounds such as divalent ions and/or silicates or other contaminants (see the list of common contaminants above). Treated water 107A may be fully or partly added, as returned water 121, to treated wastewater 80 before, at or after first-stage treatment unit 102 (first and third options illustrated in a non-limited manner). The exact details of mixing depend on the quality of wastewater 80, of pre-treated wastewater 112 and of treated water 107A—which may be controlled and adjusted (e.g., with respect to relative throughput) during the process. Returning water 121 reduces the level of sulfates and other contaminants in pre-treated wastewater to enable the reduction of the level of sulfates and enable continuous operation and low maintenance of the membranes in filtration unit(s) 105 (e.g., prevents clogging and other damage to the membranes).

Water from precipitation unit 125C and/or water removed by a filtration and/or dewatering unit 103 (e.g., a filter press or a dewatering unit, similar to or different from the units used in first stage 110) from sludge 128 may be re-introduced into concentrate 109 in second stage 120, or into returned water 121, depending on its achieved quality.

FIG. 4B illustrates schematically that either or both first-stage treatment unit 102 and/or second-stage treatment unit 125 may comprise any of coagulation and/or precipitation and/or flocculation units 118A, 118B, 118C respectively, depending on the types and levels of contaminants that should be removed, on respective flow throughputs and on specified treatment requirements. Lime and/or limestone may be added to any of the units, e.g., adjust the pH and remove sulfates in either or both first-stage treatment unit 102 and second-stage treatment unit 125.

As illustrated schematically in FIG. 4B, in various embodiments, fluidized bed reactor(s) (FBRs) 140 may be used in either or both first and second treatment stage(s) 110, 120 to remove one or more contaminants from the respective treated water. FBRs 140 may be used in addition to coagulation and/or flocculation and/or precipitation units 118A, 118B, 118C respectively, or replacing any or all combinations of these, in either or both first-stage treatment unit 102 and/or second-stage treatment unit 125.

For example, FBRs 140 may be used in second-stage treatment unit 125 to yield fast removal of sulfates, using circulation through the fluidized bed rather than precipitation, which is a much faster way to remove contaminants (e.g., 10-50 times faster). In certain embodiments, FBR(s) 140 may be used to remove sulfates by using Ca or Ca compounds, e.g., CaO, Ca(OH)$_2$, to reach sulfates levels lower than their solubility level. Byproducts 127 from FBR 140 (e.g., costed particles 148, see below) may be used in first and/or second stage 110, 120, respectively, e.g., in flocculation and/or precipitation sub-units of first-stage treatment unit 102 and/or second-stage treatment unit 125, as discussed above. For example, coated particles 148 (see FIGS. 5A and 5B below) from FBR 140 may be used in units 102 and/or 125 to remove solids, elements and/or compounds as disclosed above, to recycle material and reduce the overall solids used in systems 100. For example, coated particles 148 from FBR 140 may be used in first-stage treatment unit 102 to remove heavy metals.

FIG. 4C illustrates schematically non-limited implementations of first-stage treatment unit 102 and second-stage treatment unit 125, as few options of the range illustrated schematically in FIG. 4B. For example, coagulation units 102D, 125D in units 102, 125, respectively, may correspond to coagulation units 118B in FIG. 4B. Returned water 121 may be introduce to any of multiple locations throughout system 100, e.g., into coagulation unit 102A, flocculation unit 102B, pre-treated wastewater 112 etc., and/or the throughputs to the respective optional locations may be regulated by controller 130 according to monitored parameters of the flows—to stabilize the process and enhance its efficiency. Backwash water 106 from ultrafiltration unit(s) 105A may be introduced back into wastewater 80 and/or be mixed within and/or after first-stage treatment 102, as it is devoid of heavy metals—to further dilute sulfates and corresponding contaminants. Rejected concentrate 126 from second-stage treatment unit 125 may be dewatered 103 directly (e.g., if concentrate is essentially sludge 128), and/or water therefrom may possibly be introduce into coagulation unit 125A in second stage 120 and/or into coagulation unit 102A in first stage 110, depending on required regulation of flows and contaminants through system 100. It is noted that for simplicity, the illustration in FIG. 4C merely shows optional mixing points of returned water 121 and rejected concentrate 126, assuming that the required pipework is added accordingly.

Figures 5A, 5B:
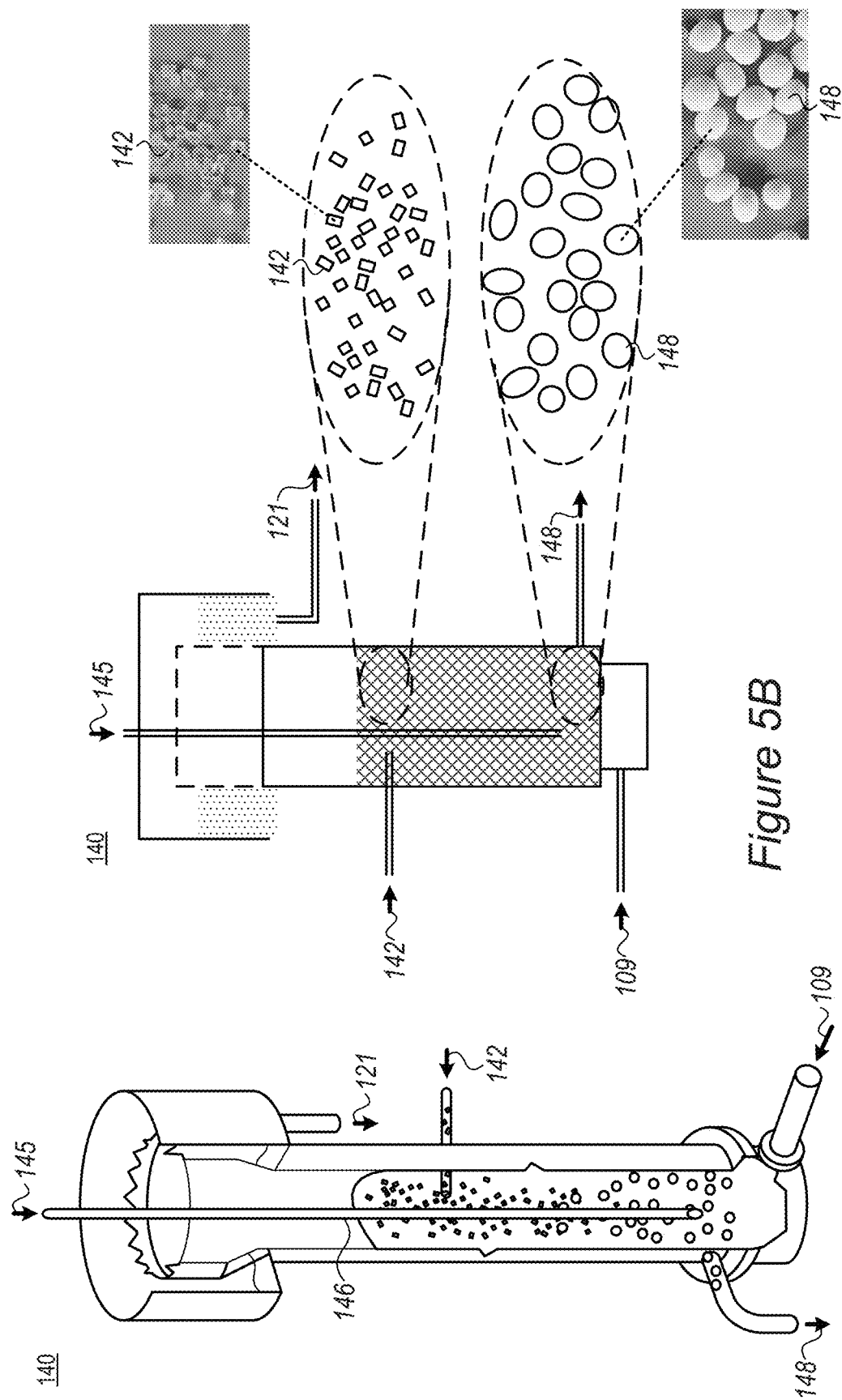
FIGS. 5A and 5B are high-level schematic illustration of FBRs (fluidized-bed reactors), according to some embodiments of the invention.

FIGS. 5A and 5B are high-level schematic illustration of FBR 140, according to some embodiments of the invention. FIG. 5A is a schematic perspective view in longitudinal cross section and FIG. 5B is a schematic longitudinal cross section with schematic examples for particles before and after coating by contaminants 142, 148, respectively. FIGS. 5A and 5B merely illustrate one non-limiting example for FBR structure, equivalent structures may be used as well. FBRs 140 utilize fine solid granular material 142 that is suspended in fast flowing treated water 109 and introduced chemicals 145 (e.g., lime, any of CaO, Ca(OH)$_2$. CaCO$_3$, optionally NaOH)—to remove contaminants from the treated water to yield treated water 121. It is noted that while prior art FBRs are used mainly to handle water hardness, disclosed FBRs 140 may be used to remove sulfate and/or other divalent and/or trivalent ions in a rapid process, that may simplify significantly ZLD industrial water treatment, while keeping the levels of these compounds low and within requirements by disclosed systems and processes.

For example, fine silicate sand 142 may be used to remove sulfates and other contaminants from concentrate 109, as part of second-stage treatment unit 125. In certain embodiments, fine solid granular material 142 such as silicate (SiO$_2$) or fine sand (e.g., in non-limiting embodiments, silica sand with grain diameter of 0.3-0.6 mm or natural quartz No. 00, may be coated by sulfates and other contaminants during the treatment process in FBR 140 and be removed (148) from FBR 140 following the process. Coated granular material 148 may then be used as substrate in first-stage treatment unit 102 and/or in second-stage treatment unit 125. Advantageously, coated granular material 148 may comprise hydroxides (OH$^-$) which may be used beneficially in first stage treatment 102 to remove heavy metals. In various embodiments, FBR 140 may be used in first-stage treatment unit 102 and/or in second-stage treatment unit 125.

It is noted that FBRs 140 may be configured differently from prior art FBRs by introducing chemicals 145 through a conduit 146 that enters FBR 140 from its top or central section and descends to the bottom of FBR 140 to release chemicals 145 there. It is noted that in typical FBRs, chemicals 145 are introduced through a conduit that enters the FBR from its bottom and ascends to release chemicals at the bottom section thereof. The disclosed change in design was found by the inventors to be more efficient in disclosed FBRs 140 as it reduces clogging of the bottom of FBR 140 by coated particles 148 (typically some barrier is present at the bottom section of FBR 140 to prevent interruption to the introduction of concentrate 109) and improved the flow through FBR 140.

Advantageously, FBRs 140 yield quick removal of large amounts of sulfates and other contaminants from concentrate 109, e.g., when used in second-stage treatment unit 125. It is noted that FBRs do not reduce the level of sulfates below their solubility level in water, as the remaining sulfates stay on the water returned (121) to first stage treatment 110. For example, FBRs in second-stage treatment unit 125 may reduce sulfate levels in concentrate 109 from, e.g., around 10,000 mg/l to around 4000 mg/l. In various embodiments, FBRs 140 in second-stage treatment unit 125 may reduce sulfate levels in concentrate 109 from, e.g., a level between 5,000-40,000 mg/l to a level between 2,000-4,000 mg/l. With respect to prior art treatment of concentrate 89 (see FIG. 6A below), FBR 140 may remove sulfates much faster (e.g., 5-10 times faster, possibly in minutes or few tens of minutes versus prior art several hours for precipitation units) and at much higher throughputs (e.g., 3-30 times larger) at the cost of not removing sulfates below their solubility level as in the prior art.

FIGS. 6A and 6B are high-level schematic illustration of prior art ZLD water treatment systems 90.

Prior art system 90 comprise multiple stages 91-93, each including a pretreatment unit 82 that removes sediments and heavy metals (as sludge or solid waste 97A) from received wastewater 80 and/or concentrate 89 from a previous stage, followed by ultrafiltration in a RO (reverse osmosis) unit 85 that provides treated water 87 and removes all salts from the wastewater in a concentrate 89, which is treated in a following stage. It is noted that in prior art systems 90, multiple stages 91-93 are required to reduce the volume of the brine (concentrate 89) produced by each stage, to reach a small throughput that then has to be specially treated to reach solid residues only.

For example, for 100 m³ wastewater 80, typically 60 m³ are produced as treated water 87 at a first purification stage 91, leaving 40 m³ as concentrate 89 of first stage 91. Repeated stages 92, 93 remove additional treated water 87 (e.g., additional 20 m³ and 10 m³, respectively) leaving more and more concentrated concentrate 89 (e.g., 20 m³ and 10 m³, respectively).

For zero liquid discharge (ZLD), the remaining concentrate 89 (e.g., of stage 93), as well as possibly sludge 97A, undergoes special treatment 95 which is usually expensive in both equipment and energy used—and results in more treated water 87 and solid waste 97. Examples for prior art special treatment 95 comprise evaporation, freeze-crystallization, or other techniques, as well as chemical treatment discussed below, e.g., using aluminate gels that yield ettringite.

However, prior art treatment of industrial wastewater which may include a large concentration of waste products (e.g., heavy metals and various salts) is especially difficult, requiring multiple treatment stages, causing damage by overloading the delicate RO membranes, quickly rendering them ineffective, and requiring complex special treatments 95 such distillation, freeze-crystallization or chemical treatment—to treat the remaining concentrate for ZLD. It is noted that these prior art special treatment methods are typically very expensive, and sometime increase the volume of solid waste 97 by addition of chemicals in the process (e.g., such as used in ion exchange technologies).

A particular difficulty in treating industrial wastewater is their high content of sulfates. Prior art methods reduce the content of sulfates below their solubility threshold (of ca. 1,500-2,000 ppm)—to under ca. 200-500 ppm (depending on specific regulation) to provide treated water 87. A specific problem is the high cost of chemicals (e.g., aluminum compounds) that are used to bind sulfates below their solubility threshold.

Prior art systems 90 typically have high CAPEX (capital expenditure) and high OPEX (operation expenditure). For example, typical costs are 40-50M$ for systems 90 treating 500-600 m³/h, of which 60-70% of the CAPEX is for special treatment 95 and 30-40% for the RO stages. In contrast, disclosed systems 100 are expected to be at a similar cost to only the RO stage of prior art systems 90, e.g., about a third the cost of prior art systems 90. Additional savings include smaller electricity use (estimated <1 Kw/m³ feed for disclosed systems 100 versus prior art costs of 2-3 Kw/m³ feed for systems 90, mainly for special treatment 95 which typically require 15-50 Kw for 1 m³ concentrate) and much lower cost for added chemicals. Moreover, prior art systems 90 use larger amount of chemicals to remove sulfates, e.g., larger amounts of Ca and Al to form in the treatment system the compound ettringite—a hydrous calcium aluminum sulfate mineral with the formula: $Ca_6Al_2(SO_4)_3(OH)_{12} \cdot 26H_2O$—requiring CaO and $Al(OH)_3$ to remove $SO_4$ by conversion in a complex chemical process. It is noted that $Al(OH)_3$ is typically required in the prior art as amorphous gel that is an expensive compound.

In contrast, in disclosed systems 100, all $SO_4$ is removed e.g., as $CaSO_4$ or gypsum. The stoichiometric balance is 1 mol Ca for 1 mol of removed $SO_4$ versus prior art ratio requiring 2 mol Ca and ⅔ mol Al for each 1 mol of removed $SO_4$. Therefore, removed solids 129 also have a much smaller mass than prior art solid waste 97 (possibly less than one half thereof), providing an additional significant advantage.

Moreover, ettringite is commonly recycled in prior art systems 90 to regenerate the aluminum hydroxide gel, using acids in an additional process—which further increase prior art CAPEX, OPEX and resulting chemical waste. In contrast, in certain embodiments, removed solids 129 of disclosed systems 100 may comprise mainly gypsum ($CaSO_4$) at a relatively high purity (e.g., above 95%, depending on the contaminants in industrial wastewater 80). Gypsum sludge (128, e.g., with 30-50% water content, or 129, dried) may be produced at ca. 5 tons sludge per hour by a 500 m³/h system 100, making a total of about 1% of processes wastewater volume. Advantageously, gypsum sludge 128 may be used in various industries (e.g., for cement, construction or agriculture) as it is, without need for further processing, and be directly sold. Using FBRs 140, resulting coated particles 148 (see FIG. 5B) may comprise gypsum-coated silica grains, that are effective in removing heavy metals in first-stage treatment unit 102, either as is or after activation, e.g., with ferric material (e.g., ferric sulfates and/or chlorides) and/or due to high content of hydroxides.

Due to the high OPEX and required high maintenance for the RO membranes, in practice, prior art industrial wastewater treatment facilities commonly become non-operational within a relative short period of their establishment, especially in developing countries, due to high operation and maintenance costs.

Advantageously, disclosed embodiments overcome the prior art limitations, to provide economical and efficient zero liquid discharge treatment of industrial wastewater. Disclosed embodiments manage and balance levels of salts and especially of sulfates throughout the treatment process and facility to reach sustainable and economical treatment of heavily polluted industrial wastewater.

Specific enablers for the advantages provided by disclosed systems 100 include:

(i) In first treatment stage 110, RO membranes and modules are replaced by ultrafiltration and/or nanofiltration membranes and modules which allow monovalent ions through into treated water 107. Disclosed systems 100 monitor and control the level of monovalent ions in treated water 107 to verify they do not exceed regulated levels. Reducing the level of purity of water 107 with respect to prior art treated water 87 maintains the acceptability of water 107 and simplifies treatment of concentrate 109 as it dismisses with the prior art need to precipitate the monovalent ions in later treatment stages 92-94. Divalent ions (e.g., sulfates) are left in concentrate 109. Specifically, when treating hard industrial wastewater, using nanofiltration membranes is advantageous to using RO membranes with respect to expected operative life of the membranes and maintenance costs.

(ii) Sulfates are removed from concentrate 109 in main treatment 125, which reduces sulfate concentration but not below the solubility threshold as in the prior art. For example, second treatment stage 120 may be configured to reduce the level of sulfates to 2,000-4,000 ppm. Advantageously, much simpler methods of sulfate removal may be used, e.g., precipitation using calcium and/or is much cheaper than prior art methods of reducing the level of sulfates below their solubility threshold (e.g., HDS—High Density Sludge treatment methods). Returned water 121 may then be mixed in first stage 110 with received industrial wastewater 80, which typically have similar or higher levels of sulfates (e.g., 4,000-10,000 ppm), so that the reduced level of sulfates is viably maintained and does not accumulate in system 100. An additional advantage resulting from the simpler sulfates removal process is that disclosed systems 100 and processes 200 are less limited, or not limited at all in size and throughput of industrial wastewater 80.

(iii) Main treatment 125 may be modified with respect to prior art treatment 82 by using FBR 140 that makes the precipitation process much quicker (e.g., typically takes minutes instead of prior art processes that take hours)—and sufficient for the relaxed requirements concerning the sulfate level reduction. Sulfates removal and FBR 140 may be used as alternatives or may be both used for partial treatment 125.

(iv) Some of the treatment byproducts 127 from stage 120 may be used in first-stage treatment unit 102 of stage 110 to further enhance pretreatment. For example, CaSO$_4$ and/or used (coated) solid granular material 148 from FBR 140 may be used as coagulant in first-stage treatment unit 102.

Further advantage is provided by controller 130 that may be configured to monitor and regulate the flows throughout system 100, maintaining levels of specified ions and compounds within specified ranges, e.g., sulfates, monovalent ions, silica, metal ions, calcium. In particular, controller 130 is configured to provide treated water 107 within specifications, control the quality of returned water 121 that is transferred from stage 120 into pretreatment 102 in stage 110, control the optional transfer of treatment products 127 from stage 120 into pretreatment 102 in stage 110, and monitor efficiency and maintenance of nanofiltration modules 105.

Figure 7:
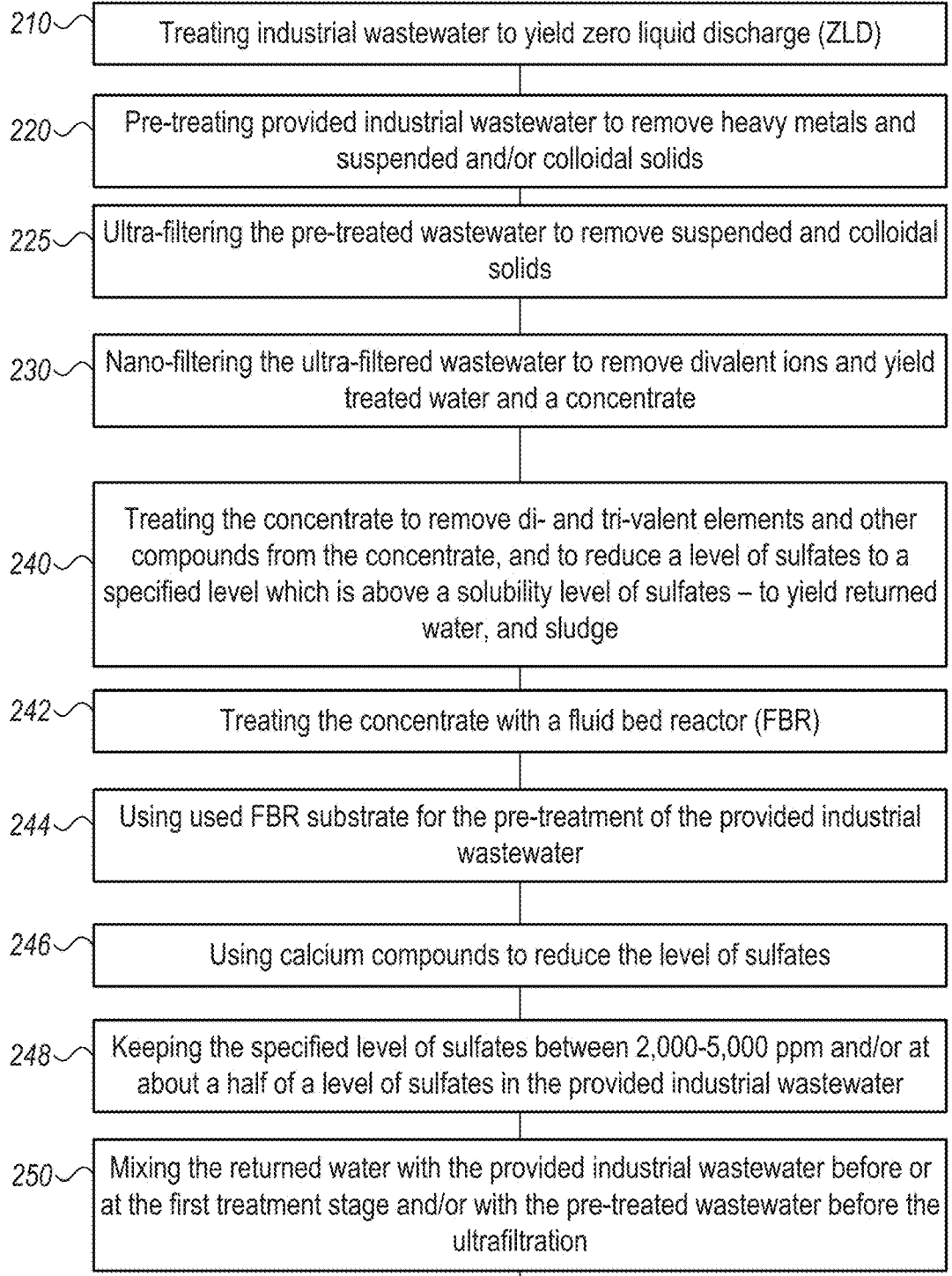
FIG. 7 is a high-level flowchart illustrating methods of wastewater treatment that yields zero liquid discharge (ZLD), according to some embodiments of the invention.
Figure 7:
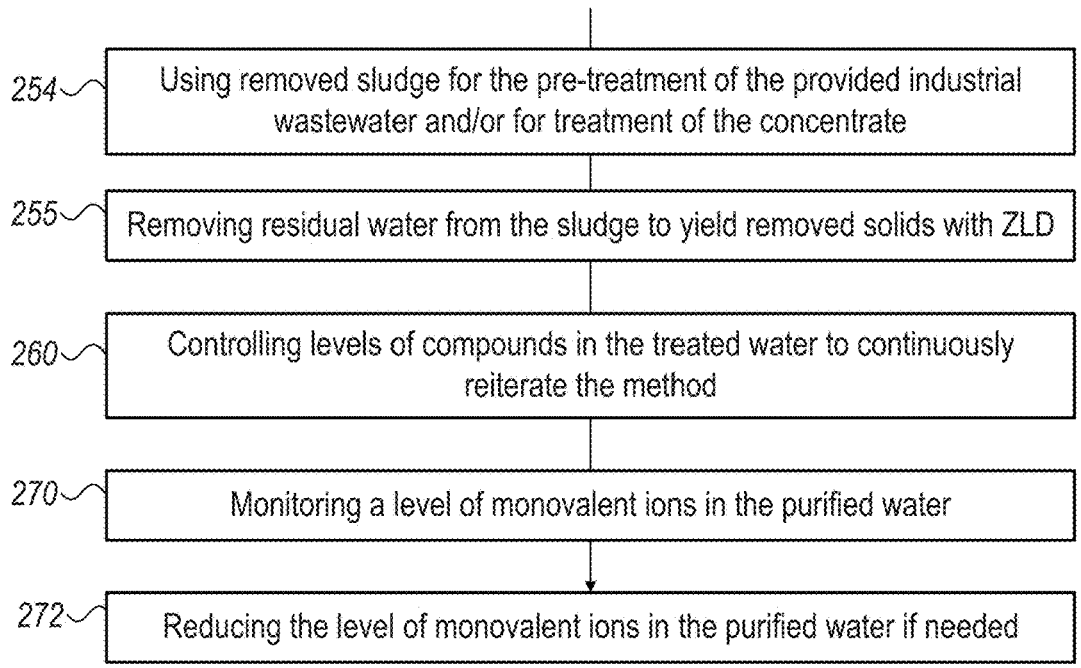

FIG. 7 is a high-level flowchart illustrating methods 200 of wastewater treatment that yields zero liquid discharge (ZLD), according to some embodiments of the invention. The method stages may be carried out with respect to systems 100 described above, which may optionally be configured to implement methods 200. Method 200 may comprise the following stages, irrespective of their order.

Method 200 may comprise treating industrial wastewater treatment to yield ZLD (stage 210) by pre-treating provided industrial wastewater to remove heavy metals (and possibly other contaminants, according to the wastewater quality), remove suspended and/or colloidal solids (reduce TDS and/or TSS) and possibly remove divalent ions such as sulfates (stage 220), ultra-filtering the pre-treated wastewater to remove suspended and colloidal solids (stage 225), nano-filtering the ultra-filtered wastewater to remove divalent ions (e.g., sulfates) and yield treated water (that may include monovalent ions and some divalent ions) and a concentrate (stage 230), treating the concentrate to remove di- and tri-valent elements and other compounds from the concentrate, and to reduce a level of sulfates to a specified level which is above a solubility level of sulfates—to yield returned water, and sludge (stage 240), mixing the returned water with the provided industrial wastewater before or at the first treatment stage and/or with the pre-treated wastewater before the ultrafiltration (stage 250) and removing residual water from the sludge to yield removed solids with ZLD (stage 255). In certain embodiments, method 200 may further comprise using removed sludge for the pre-treatment of the provided industrial wastewater and/or for treatment of the concentrate (stage 254).

In certain embodiments, method 200 may further comprise controlling levels of compounds in the treated water to continuously reiterate the stages of method 200 (stage 260).

In certain embodiments, method 200 may comprise treating the concentrate using calcium and/or calcium compounds and/or sodium hydroxide (e.g., any of Ca, CaO, Ca(OH)$_2$, CaCO$_3$, NaOH, etc.) to reduce the level of sulfates (sage 246). For example, method 200 may comprise keeping the specified level of sulfates between 2,000-5,000 ppm or between 2,500-4,000 ppm and/or at about a half of a level of sulfates in the provided industrial wastewater (sage 248), depending on regulated required sulfate level reduction and system configuration.

In certain embodiments, method 200 may comprise treating the concentrate with a fluid bed reactor (FBR) (stage 242) and optionally utilizing used FBR substrate for the pre-treatment of the provided industrial wastewater (stage 244). The FBR may be used to provide the full treatment of the concentrate or to provide a partial treatment of the concentrate, accompanied by, e.g., coagulation and/or flocculation treatment.

In certain embodiments, method 200 may comprise monitoring a level of monovalent ions in the treated water (stage 270), and reducing the level thereof if needed (stage 272).

It is noted that specific values may be modified and are understood to encompass ±10% of the respective values.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of wastewater treatment that yields zero liquid discharge (ZLD), the method comprising:
    pre-treating provided industrial wastewater to remove heavy metals and suspended and/or colloidal solids to provide pre-treated wastewater,
    ultra-filtering the pre-treated wastewater to remove suspended and colloidal solids,
    nano-filtering the ultra-filtered wastewater to yield treated water and a concentrate, wherein the treated water comprises monovalent ions,
    treating the concentrate with a fluid bed reactor (FBR) and using calcium, calcium compounds and/or sodium hydroxide in the FBR to remove di- and tri-valent elements and other compounds from the concentrate, to reduce a level of sulfates to a specified level which is above a solubility level of sulfates and to yield returned water, and sludge,
    utilizing used FBR substrate for the pre-treatment of the provided industrial wastewater,
    mixing the returned water with the provided industrial wastewater before or at the first treatment stage and/or with the pre-treated wastewater before the ultrafiltration, and
    removing residual water from the sludge to yield removed solids with ZLD.

2. The method of claim 1, further comprising controlling levels of compounds in the treated water to continuously reiterate the method.

3. The method of claim 1, wherein the specified level of sulfates is between 2,000-5,000 ppm.

4. The method of claim 1, wherein the specified level of sulfates is about a half of a level of sulfates in the provided industrial wastewater.

5. The method of claim 1, further comprising monitoring a level of monovalent ions in the treated water, and reducing the level thereof according to the monitoring.

6. A method of wastewater treatment that yields zero liquid discharge (ZLD), the method comprising:
    pre-treating provided industrial wastewater to remove heavy metals and suspended and/or colloidal solids to provide pre-treated wastewater,
    ultra-filtering the pre-treated wastewater to remove suspended and colloidal solids,
    nano-filtering the ultra-filtered wastewater to yield treated water and a concentrate, wherein the treated water comprises monovalent ions,
    treating the concentrate with a fluid bed reactor (FBR) to remove di- and tri-valent elements and other compounds from the concentrate, to reduce a level of sulfates to a specified level which is above a solubility level of sulfates and to yield returned water, and sludge,
    utilizing used FBR substrate for the pre-treatment of the provided industrial wastewater,
    mixing returned water with the provided industrial wastewater before or at the first treatment stage and/or with the pre-treated wastewater before the ultrafiltration, and
    removing residual water from the sludge to yield removed solids with ZLD.

7. The method of claim 6, further comprising controlling levels of compounds in the treated water to continuously reiterate the method.

8. The method of claim 6, wherein the specified level of sulfates is between 2,000-5,000 ppm.

9. The method of claim 6, wherein the specified level of sulfates is about a half of a level of sulfates in the provided industrial wastewater.

10. The method of claim 6, further comprising monitoring a level of monovalent ions in the treated water, and reducing the level thereof according to the monitoring.

* * * * *